Figure 1:
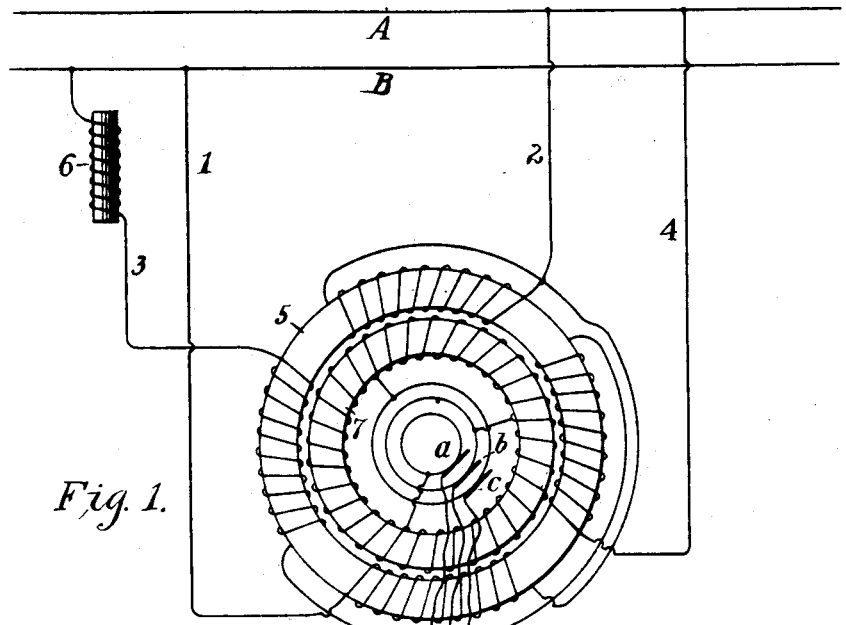

No. 610,025. Patented Aug. 30, 1898.
C. S. BRADLEY.
ALTERNATING CURRENT MOTOR.
(Application filed Sept. 17, 1897.)
(No Model.)

Witnesses:
C. L. Belcher
Elizabeth Ewing

Inventor
Charles S. Bradley
By Robt. Adead
his Attorney

THE NORRIS PETERS CO., PHOTO-LITHO., WASHINGTON, D. C.

UNITED STATES PATENT OFFICE.

CHARLES S. BRADLEY, OF AVON, NEW YORK.

ALTERNATING-CURRENT MOTOR.

SPECIFICATION forming part of Letters Patent No. 610,025, dated August 30, 1898.

Application filed September 17, 1897. Serial No. 652,084. (No model.)

*To all whom it may concern:*

Be it known that I, CHARLES S. BRADLEY, a citizen of the United States, and a resident of Avon, in the county of Livingston, in the State of New York, have invented certain new and useful Improvements in Alternating-Current Motors, of which the following is a specification.

This invention relates to electric motors, the object being to provide a motor that may be driven by single-phase alternating currents that will have a strong running and starting torque and may be operated at variable speeds. In carrying out the invention I provide a rotary field-winding to one element of the motor to develop therein a rotary or shifting magnetic field by carrying two or more independent branches from a pair of single-phase supply-mains, one of which includes, either outside of the motor-windings or as part of the same, sufficient inductance to establish a phase difference in the currents set up in the rotary field-winding to develop a practical rotary magnetic field the poles of which shift under the coöperation of two currents in a manner well understood by those familiar with alternating-current motors. The secondary element of the motor is provided with a winding with which is connected an external circuit including one or more adjustable condensers, the capacity of which may be regulated by a switch. With this organization the capacity may be adjusted for any desired speed at which it is desired to operate the motor, so that a consonous relationship is established between the primary impulses of the supply-generator and secondary impulses of the motor. When the secondary motor-circuit is thus adjusted, a strong current will flow, as the motor inductance is neutralized and an analogy to a resonant electric circuit is set up by this consonous relationship, as has been fully described in a prior patent issued to me, No. 557,957, dated April 7, 1896. The establishment of this relationship by interposing the condensers in the secondary circuit as described effects a very important result—namely, of increasing the phase difference capable of economical establishment by means of inductances and avoiding lagging currents in the lines. The latter effect inheres also in my prior patent just above referred to; but the former is a distinct result of especial advantage only in an organization where the phase differences are locally established. A good condition is maintained, therefore, for the development of the rotary field and for a good coöperation with said field of the secondary element of the motor. The adjustable condensers are of sufficient capacity to provide when necessary more than the amount required to produce consonance at working motor speeds, thereby permitting the inductance to be neutralized and a lead given to the line current. This result is especially advantageous in the case of single-phase motors where inductance is employed to effect difference of phase, as an effective guard is provided against disturbance of the line.

The several features of novelty of the invention will be hereinafter more fully described and will be definitely indicated in the claims.

Figure 2:
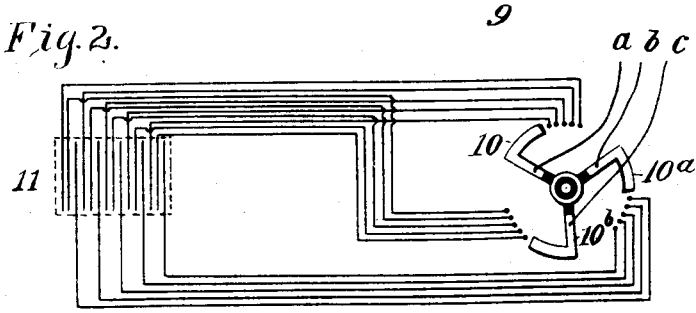

In the accompanying drawings, which illustrate the invention, Figure 1 is a diagram of a motor embodying my improvements, and Fig. 2 is a diagram of a modification.

A B represent two separate wires of a single-phase alternating-current circuit. From these wires are led a plurality of circuits 1 2 3 4, provided with phasing devices for establishing a difference of phase and setting up a rotary or shifting magnetic field in the primary element 5 of the motor. I have shown a simple quarter-phase winding on the motor, the difference of phase being secured by the interposition of an inductance 6 in one branch. The phase displacement produced by the inductance may be approximately ninety degrees for a quarter-phase winding. The secondary element 7 of the motor is provided with a winding tapped at a plurality of points and connected with contact-rings from which brushes, as $a\ b\ c$, lead to an external circuit. This external circuit includes a plurality of condensers or a single polyphase condenser. As shown in Fig. 1 three condensers are employed, one set of plates in each condenser being connected with a range of contacts with which coöperates a circuit-closing arm $8\ 8^a\ 8^b$, controlled by a handle 9. Thus when the handle is shifted the three arms $8\ 8^a\ 8^b$ are brought simultaneously into engagement with more or less of the contacts leading to the condenser-plates and a greater or less capacity is included in the secondary circuit of the motor. The brush-arms 8 8ª 8ᵇ are electrically connected together through the operating-handle or otherwise, so that the several branches of the secondary circuit will be interconnected when the condensers are brought into operation.

In lieu of a plurality of condensers a single polyphase condenser may be employed, of a type described in my Patent No. 543,978, dated August 6, 1895. An organization of this kind is diagrammatically shown in Fig. 2, where $a\ b\ c$ represent three leads of the secondary circuit and are connected with insulated metallic arms 10 10ª 10ᵇ, secured together so as to be capable of simultaneous control. Each of these arms coöperates with a range of contacts leading to a section of a polyphase condenser 11, and any desired amount of condenser-surface may be cut into action by operating the switch. By the adjustment of the secondary circuit the inductance of said circuit is to a greater or less extent neutralized and the phase of secondary current is modified. By a consonous adjustment, as described in my patent above referred to, the phase may be made coincident with the primary impulses, and by cutting in more capacity it may be made to lead the primary impulses. Thus any lag produced in the line currents by the interposition of a motor may be modified or neutralized, thereby preventing idle currents and improving the efficiency of the distribution system. Moreover, since by a proper adjustment of the condensers a lead may be given to that branch of the primary circuit which is free from auxiliary inductance, it will be evident that a greater phase difference of the two primary branches may be effected, since sufficient inductance may be included in the one branch to produce a certain lag behind the phase of the generator, and the lead established by the secondary condensers increases the phase difference by the amount of this lead.

I am aware that it has been proposed to employ inductance for effecting a difference of phase and developing shifting magnetic fields and that it has been proposed, as set forth in one of my patents above referred to, to provide a polyphase motor with a consonous secondary circuit. My present invention relates specifically to the type of polyphase motors in which the phase difference of the magnetizing-currents is locally produced. In such an instance there is an intimate coöperation between the consonous secondary and the primary phasing-circuits, resulting in the obviation of deleterious lagging currents which materially interfere with the successful operation of such organizations.

Having thus described my invention, what I claim as new, and desire to secure by Letters Patent, is—

1. An electric motor having a primary winding provided with a plurality of branches, one or more of which includes inductance to set up in the primary core a rotary field when connection is made with a single-phase current, and a secondary element the winding of which is connected with an adjustable phase-leading device.

2. An electric motor provided with a rotary field-winding on its primary element, the several leads of which are adapted for connection with a single-phase circuit and include inductance or inductances to produce a difference of phase, and a secondary circuit including an adjustable condenser to produce a maximum phase separation.

3. An electric motor provided with a rotary field-winding on its primary element, the several leads of which are adapted for connection with a single-phase circuit and include inductance or inductances to produce a difference of phase, and a polyphase secondary circuit including an adjustable condenser for each branch.

In testimony whereof I have hereunto subscribed my name this 27th day of August, A. D. 1897.

CHARLES S. BRADLEY.

Witnesses:
  ROBT. H. READ,
  ALICK G. MACANDREW.